(No Model.)

C. L. COFFIN.
ELECTRIC HEATING AND WELDING APPARATUS.

No. 507,419. Patented Oct. 24, 1893.

WITNESSES
Gertrude H. Anderson
Geo H Lothrop

INVENTOR
Charles L. Coffin

UNITED STATES PATENT OFFICE.

CHARLES L. COFFIN, OF DETROIT, MICHIGAN.

ELECTRIC HEATING AND WELDING APPARATUS.

SPECIFICATION forming part of Letters Patent No. 507,419, dated October 24, 1893.

Application filed January 26, 1893. Serial No. 459,838. (No model.)

*To all whom it may concern:*

Be it known that I, CHARLES L. COFFIN, of Detroit, in the county of Wayne and State of Michigan, have invented a new and useful Improvement in Methods of and Apparatus for Heating, Welding, or Working Metals Electrically, of which the following is a specification.

My invention consists in a method of and apparatus for heating, welding or working metals electrically, hereinafter fully described and claimed.

Figure 1:
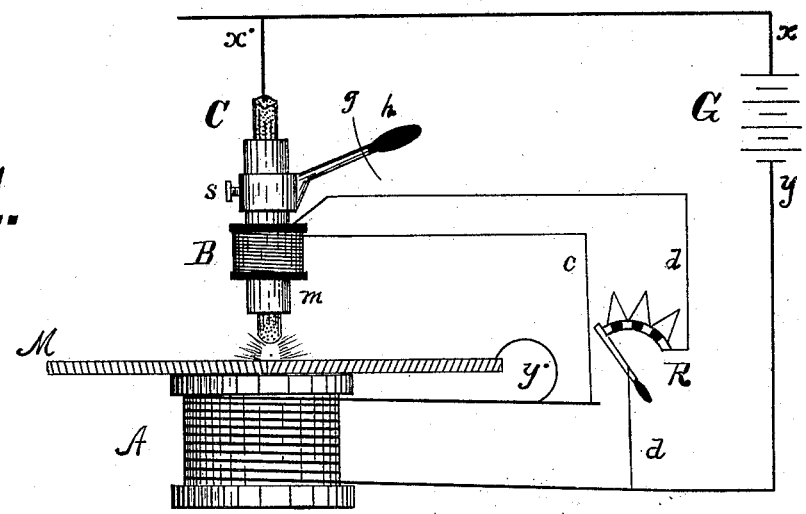
Figure 2:
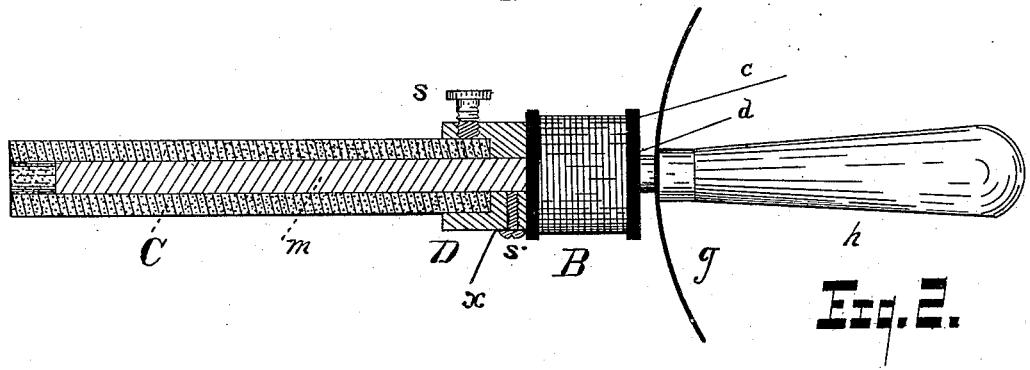

Figure 1 is a diagrammatic elevation of an apparatus which may be used to practice my invention, and Fig. 2 is a side view, partly in section, of a modification of the upper carbon mechanism.

A represents an electro-magnet, above which is supported the material M.

G represents a generator, one pole of which is connected through the winding of the electro-magnet A with the material M by the conductors Y and Y'. Although shown wound in this manner, the magnet A may have its winding in a shunt circuit, in parallel, or may be in an independent circuit, separately excited, the main thing being that the material shall be connected with one terminal of the generator, and that the magnet shall be excited.

C represents a carbon above material M, connected by conductors X and X' with the other terminal of generator G. The carbon C is held in a holder $m$, provided with an insulating handle $h$, having a shield $g$ and a set screw $s$ to connect it with the carbon holder $m$.

The carbon holder $m$ may be of material which is permanently magnetic, or may be of magnetic metal forming the core of an electro-magnet B which is shown in the drawings as connected by a shunt circuit $c$ $d$, in which may be interposed if desired, a resistance switch R.

In Fig. 1 the carbon holder $m$ is hollow with the carbon running through it. This however may be reversed, as shown in Fig. 2, in which the magnetic material $m$ may be a solid rod running down through a hollow carbon C, the two being connected by a holder $d$, (preferably diamagnetic) clamped by a set screw $s'$ to the magnetic rod $m$, and by a thumb screw S to the carbon C.

I prefer to have the upper pole of magnet A a north pole, and the lower pole of magnet $m$ a south pole if the current in the welding arc formed between the material M and the carbon C is from said material to said carbon, whenever the current is not so strong as to produce an arc of too great size and intensity. With this arrangement the lines of magnetic-force will flow from magnet A to magnet $m$ in the same direction as the current, and will inclose the arc in a field of magnetic lines, thus holding it steady and preventing it from wavering. If the polarity of the magnets be reversed, the direction of the current remaining the same, the effect of the lines of magnetic force will be to reduce the flow of the current, and thus reduce the size and intensity of the arc when this is too great. Thus with the current and lines of magnetic force flowing in the same direction, the arc is steadied, but not reduced, while with the lines of magnetic force and current flowing in opposite directions, the arc is steadied but at the same time reduced in intensity.

What I claim as my invention, and desire to secure by Letters Patent, is—

1. The herein described mode of heating, welding or working metal electrically, consisting in springing an arc between the material to be heated or welded and an extraneous conductor, between the poles of two magnets, located at opposite sides of the material to be heated or welded, said arc springing within the lines of magnetic force extending between said magnets.

2. In an apparatus for electrically welding metal, the combination with a generator having one terminal connected with the material to be heated or welded, and an extraneous conductor connected with the other terminal of said generator, of two magnets located at opposite ends of the arc, substantially as shown and described.

3. In an apparatus for electrically welding or working metal by means of a voltaic arc sprung between the article to be welded or worked and an extraneous conductor, a magnetic holder for said extraneous conductor, and a magnetic support for the material, substantially as shown and described.

CHARLES L. COFFIN.

Witnesses:
 GERTRUDE H. ANDERSON,
 GEO. H. LOTHROP.